(12) United States Patent
Maienschein

(10) Patent No.: US 9,702,447 B2
(45) Date of Patent: Jul. 11, 2017

(54) VIBRATION-DAMPED STARTER ELEMENT FOR A DRIVETRAIN OF A MOTOR VEHICLE

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/890,061

(22) PCT Filed: Apr. 30, 2014

(86) PCT No.: PCT/DE2014/200189
§ 371 (c)(1),
(2) Date: Nov. 9, 2015

(87) PCT Pub. No.: WO2014/190986
PCT Pub. Date: Dec. 4, 2014

(65) Prior Publication Data
US 2016/0102745 A1    Apr. 14, 2016

(30) Foreign Application Priority Data

May 27, 2013  (DE) .................. 10 2013 209 744
May 27, 2013  (DE) .................. 10 2013 209 749

(51) Int. Cl.
*F16H 45/02*  (2006.01)
*F16H 41/04*  (2006.01)
*F16F 15/123*  (2006.01)
*F16H 45/00*  (2006.01)

(52) U.S. Cl.
CPC ........... *F16H 45/02* (2013.01); *F16F 15/123* (2013.01); *F16H 41/04* (2013.01); *F16H 2045/007* (2013.01); *F16H 2045/0205* (2013.01); *F16H 2045/0221* (2013.01); *F16H 2045/0252* (2013.01); *F16H 2045/0278* (2013.01)

(58) Field of Classification Search
None
See application file for complete search history.

(56) References Cited

U.S. PATENT DOCUMENTS

| | | | | |
|---|---|---|---|---|
| 2004/0060793 | A1* | 4/2004 | Dacho | F16H 45/02 192/3.29 |
| 2009/0125202 | A1* | 5/2009 | Swank | F16F 15/12353 701/68 |
| 2010/0276243 | A1* | 11/2010 | Arhab | F16D 13/683 192/3.29 |

FOREIGN PATENT DOCUMENTS

| | | |
|---|---|---|
| DE | 102011075241 | 12/2011 |
| DE | 102011017655 | 10/2012 |
| DE | 102012212174 | 2/2013 |
| WO | 2008/043331 | 4/2008 |

* cited by examiner

*Primary Examiner* — Mark Manley
(74) *Attorney, Agent, or Firm* — Simpson & Simpson, PLLC

(57) ABSTRACT

A starter element for a drivetrain of a motor vehicle having a housing, the housing being mounted on at least one shaft and the housing being coupled by means of an elastic element to a component located in a power stream of the starter element.

8 Claims, 3 Drawing Sheets

VIBRATION-DAMPED STARTER ELEMENT FOR A DRIVETRAIN OF A MOTOR VEHICLE

CROSS-REFERENCE TO RELATED APPLICATIONS

The present application is the U.S. national stage application pursuant to 35 U.S.C. §371 of International Application No. PCT/DE2014/200189, filed on Apr. 30, 2014, which application claims priority from German Patent Application Nos. DE 10 2013 209 744.1, filed on May 27, 2013, and DE 10 2013 209 749.2, filed on May 27, 2013, which applications are incorporated herein by reference in their entireties.

TECHNICAL FIELD OF THE INVENTION

The present invention relates to a starter element for the drivetrain of a motor vehicle, with the aid of which a transmission of torque from a drive motor to a transmission can be interrupted when necessary.

BACKGROUND OF THE INVENTION

With known starter elements, for example wet-running clutches or hydrodynamic torque converters, the problem exists that they transmit vibrations of the drive motor to the transmission and the body of the motor vehicle. In this connection, with the known starter elements, a housing provides one of the proportionally greatest mass moments of inertia of the starter element. This mass moment of inertia is used vibrationally by a drive-side coupling solely to increase a drive-side mass inertia. The vibrations can result in increased wear, premature failure and unwanted noise.

SUMMARY OF THE INVENTION

According to aspects illustrated herein, there is provided a starter element for a drivetrain of a motor vehicle, the starter element having a housing mounted on at least one shaft, a component located in a power stream of the starter element, and, an elastic element coupling the housing to the component.

According to aspects illustrated herein, there is provided a motor vehicle having a drive motor, a transmission, and, a starter element having a housing mounted on at least one shaft, a component located in a power stream of the starter element, and, an elastic element coupling the housing to the component.

The object of the invention is therefore to at least partially solve the problems described in reference to the prior art, and in particular to specify a starter element for a drivetrain of a motor vehicle whose housing is designed so that it reduces vibrations of a drive motor. In addition, a motor vehicle having a starting element is to be specified whose housing is designed so that it reduces vibrations of a drive motor.

These objects are fulfilled with a starter element for a drivetrain of a motor vehicle and a motor vehicle according to the features of the independent claims. Additional advantageous forms of the invention are specified in the subordinate claims. It should be pointed out that the features listed individually in the subordinate claims can be combined with each other in any technologically reasonable way and define additional forms of the invention. Furthermore, the features specified in the claims are explained in greater detail and more precisely in the description, while additional preferred forms of the invention are depicted.

The starter element for a drive train of a motor vehicle has a housing, the housing being mounted on at least one shaft and the housing being coupled by means of an elastic element to a component located in a power stream of the starter element.

Drive motors of motor vehicles customarily have a minimum speed (idle speed). To move off from a standstill, a rotational speed gap between a lowest motor operating speed and a non-moving transmission input shaft must be closed by a starter element. The starter element can also serve during shifting processes to interrupt a transmission of torque from a flywheel of the internal combustion engine to a transmission. The starter element proposed here is in particular a wet-running (startup) clutch or a hydrodynamic torque converter. Wet-running is understood here to mean that a housing of the clutch can have a fluid flowing through it, for example (transmission) oil, so that energy introduced into the clutch by frictional action is removable by the fluid. A hydrodynamic torque converter is the standard starter element in conventional automatic transmissions. It is not only a speed variator (clutch), but a speed/torque converter (transmission). The individual elements of the hydrodynamic torque converter are flow machines that form a closed flow circuit. A mechanical energy introduced via a drive shaft is converted by an impeller into hydraulic energy of a fluid, and then by a turbine wheel again into mechanical energy which, minus losses that occur, can be captured from an output shaft. Besides the two main elements of impeller and turbine wheel, a hydrodynamic clutch normally also has a diffuser for torque conversion (for example "Föttinger clutch" or "Trilok converter").

The housing of the starter element is mounted on at least one shaft. The at least one shaft is in particular a first shaft or drive shaft of the starter element which is connectible to a drive motor, in particular a crankshaft of the drive motor, and/or a second shaft or output shaft of the starter element which is connectible to a transmission of the vehicle. The housing is mounted either non-rotatably on the at least one shaft or rotatably on the at least one shaft, the mounting being realized in the latter case with the help of a bearing, in particular a roller bearing.

Furthermore, an elastic element couples the housing to a component located in a power stream of the starter element. This means in particular that the housing is connected directly to the elastic element. The elastic element is understood to be in particular a torsion damper. The elastic element is preferably fastened between components which are movable in relation to each other. It must be clarified at this point that additional elastic elements may be provided before and/or after the housing in the direction of the power stream. In particular, additional elastic elements may be positioned ahead of a transmission input. In any case, the elastic element is suitable for reducing a vibration amplitude of a vibration caused by the drive motor, in particular up to a transmission input. To this end, the elastic element may consist at least partially of rubber. A particular advantage of the invention consists in the fact that an entire housing mass is used to damp the vibration of the drive motor. In other words, the housing is positioned as an absorber to eliminate the vibration in the drivetrain of the motor vehicle.

A component located in a power stream of the starter element is understood to mean a component of the starter element with the aid of which a torque is (directly) transmissible from the drive motor to a transmission. In other words, power stream means a route through the starter element along which a torque of the drive motor is transmissible by the starter element to drive the vehicle.

The elastic element is preferably a spring. The spring is in particular a straight spring and/or a bow spring, which in particular may be connected in parallel or in series.

It is also advantageous if the housing is positioned between at least two elastic elements. In particular, the housing may be positioned between the at least two elastic elements under pre-tensioning. An especially high damping performance can be achieved by this means.

Furthermore, it is advantageous if the housing is coupled with, in particular connected to, the turbine wheel.

Furthermore, it is also advantageous if the power stream runs through the housing. It must be clarified in this connection that the power stream runs entirely or partially through the housing.

It is also advantageous if the housing is sealed fluid-tight in relation to the at least one shaft. Appropriate seals may be placed on the at least one shaft for this purpose.

It is especially advantageous if a first shaft is drivable by a crankshaft end of a drive motor, there being an impeller non-rotatably mounted on the first shaft, and a turbine wheel rotatably mounted on the first shaft, and a second shaft being drivable by the turbine wheel. The first shaft is in particular a drive shaft of the starter element, by means of which a torque of the drive motor can be introduced into the starter element. The impeller and the turbine wheel are preferably components of a hydrodynamic torque converter. The impeller converts the mechanical energy introduced by means of the first shaft to hydraulic energy of a fluid, which is converted back to mechanical energy by the turbine wheel. The turbine wheel is thus able to drive a second shaft, which is in particular an output shaft, by means of which the mechanical energy can be conveyed to a transmission.

It is also advantageous if the second shaft is drivable through the housing by the turbine wheel. This means in particular that the mechanical energy of the turbine wheel is conveyed through the housing to the second shaft. The turbine wheel is integrated in particular into the housing, in order to increase a mass moment of inertia of the housing.

Furthermore, it is advantageous if a clutch is situated in the housing, by means of which the first housing is non-rotatably connected or secured to the second shaft. This clutch is in particular a so-called torque converter lockup clutch, which is preferably disengaged only when the vehicle is being driven off. After the vehicle has been driven off, the clutch is preferably engaged, so that the torque is no longer conveyed through the impeller and the turbine wheel, but directly through the clutch. In this way, a power loss of the starter element is reduced in a beneficial manner, which increases its efficiency accordingly.

The at least one shaft is preferably connectible to a transmission. This transmission is in particular an automatic gear-changing transmission or a manual gear-changing transmission.

In accordance with another aspect of the invention, a motor vehicle having a drive motor, a transmission and a starter element according to the invention is also proposed.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
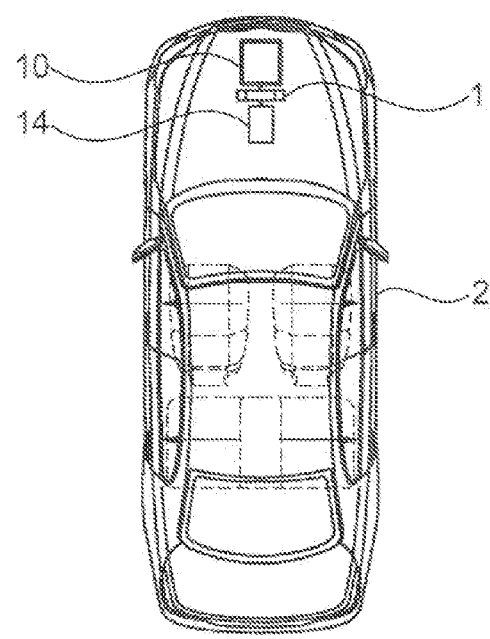
FIG. 1 is a top view of a motor vehicle having a starter element.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 2:
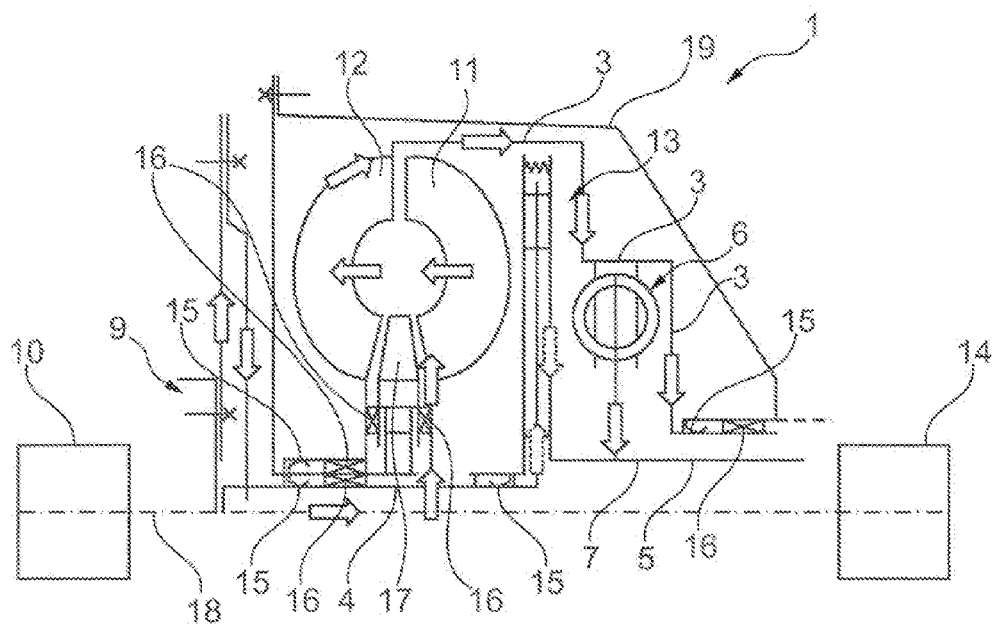
FIG. 2 is a schematic of an exemplary embodiment of a starter element.

FIG. 1 shows a motor vehicle 2 having a drive motor 10, a starter element 1 and a transmission 14. The starter element 1 is shown in FIG. 2 in a detail view, the starter element 1 in this example being a hydrodynamic torque converter. An impeller 11 is non-rotatably mounted and a turbine wheel 12 is rotatably mounted on a first shaft 4. The mounting of the turbine wheel 12 on the first shaft 4 is accomplished to this end with the aid of a bearing 16. Furthermore, a diffuser 17 is positioned between the impeller 11 and the turbine wheel 12. The turbine wheel 12 is connected to a housing 3, which in this example is a housing 3 of the hydrodynamic torque converter. Housing 3 is rotatably connected to the turbine wheel 12. Furthermore, the housing 3 is coupled by means of an elastic element 6, which in this example is a torsion damper, to a component 7, which in this example is a second shaft 5. The first shaft 4, the impeller 11, the diffuser 17, the turbine wheel 12, the housing 3 and the elastic element 6 and the second shaft 5 are rotatable around an axis of rotation 18. In addition, the housing 3 is attached fluid-tight to the first shaft 4 and the second shaft 5, to which end seals 15 are installed on the corresponding bearings 16. The first shaft 4 is drivable by means of a crankshaft end 9 of the drive motor 10, by which the first shaft 4 may be set in rotation around the axis of rotation 18. The rotating first shaft 4 sets the impeller 11 in rotation, which in turn drives the turbine wheel 12. The turbine wheel 12 thereby drives the housing 3, whereby the second shaft 5 is driven in turn. The second shaft 5 serves as the output shaft, by which the torque of a drive motor 10 is conveyed to a transmission 14. The power stream of the starter element 1 is depicted in FIG. 2 by arrows. The starter element 1 has in addition a clutch 13 by which the torque is transmissible directly from the first shaft 4 to the second shaft 5, bypassing the impeller 11 and the turbine wheel 12. This is indicated in FIG. 2 by dashed arrows. In addition, all components of the starter element 1 are enclosed by a transmission housing 19, which is rotatably attached fluid-tight to the first shaft 4 and the second shaft 5 using bearings 16 and seals 15.

Figure 3:
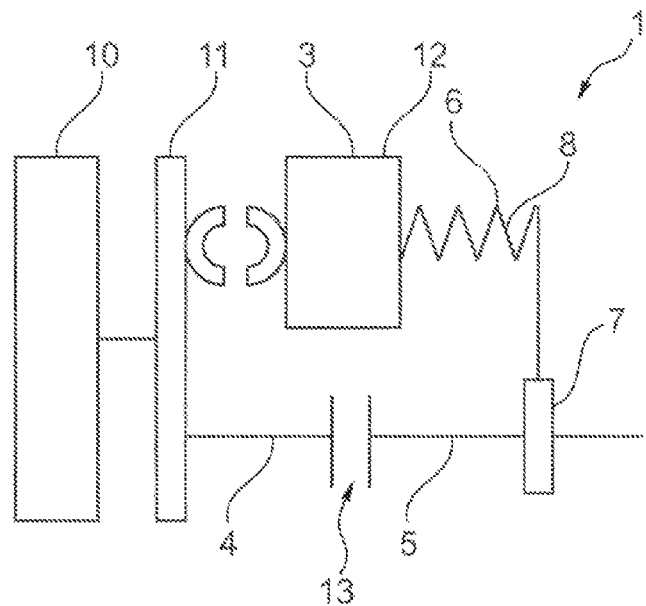
FIG. 3 is a basic layout diagram of the startup element shown in FIG. 2.

FIG. 3 shows the first example of the starter element 1 of FIG. 2 as a basic layout diagram. The essential elements are depicted symbolically here in terms of their relevant masses or mass inertias as rectangles. The starter element 1 comprises the drive motor 10, the impeller 11, the turbine wheel 12 located in the housing 3 and the clutch 13, by which the first shaft 4 and the second shaft 5 are connectible with each other. The housing 3 is coupled to a component 7 by means of an elastic element 6, which in this example is a spring 8, and thus operates vibrationally as a (vibration) absorber. The component 7 here represents the output sides of the clutch 13 and the elastic element 6.

Figure 4:
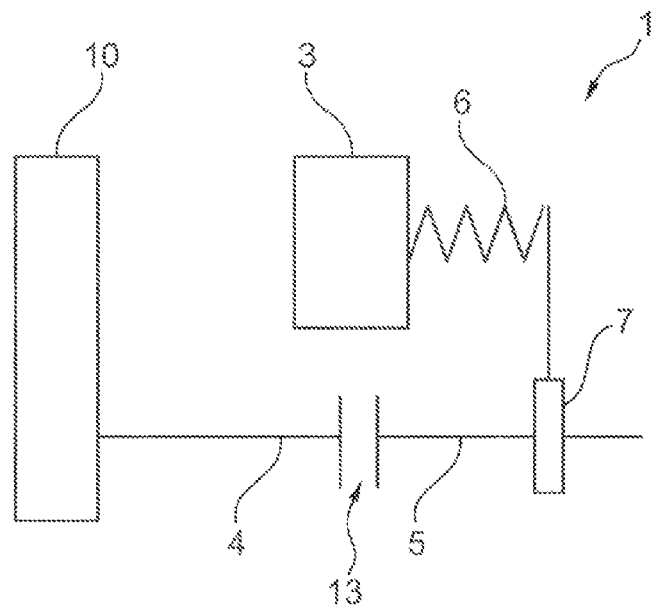
FIG. 4 is a basic layout diagram of an exemplary embodiment of a starter element.

FIG. 4 shows a second example of the starter element 1, which in this example is a wet-running clutch (without a hydrodynamic circuit). The drive motor 10 drives the first shaft 4, which is connectible to the second shaft 5 by means of the clutch 13. The housing 3 in turn is vibrationally connected by means of an elastic element 6 to a component 7 of the starter element 1. The housing 3 acts with its mass moment of inertia in combination with the elastic element 7 as a (vibration) absorber. The component 7 here represents the output side of the elastic element 6 in terms of its mass inertia.

Figure 5:
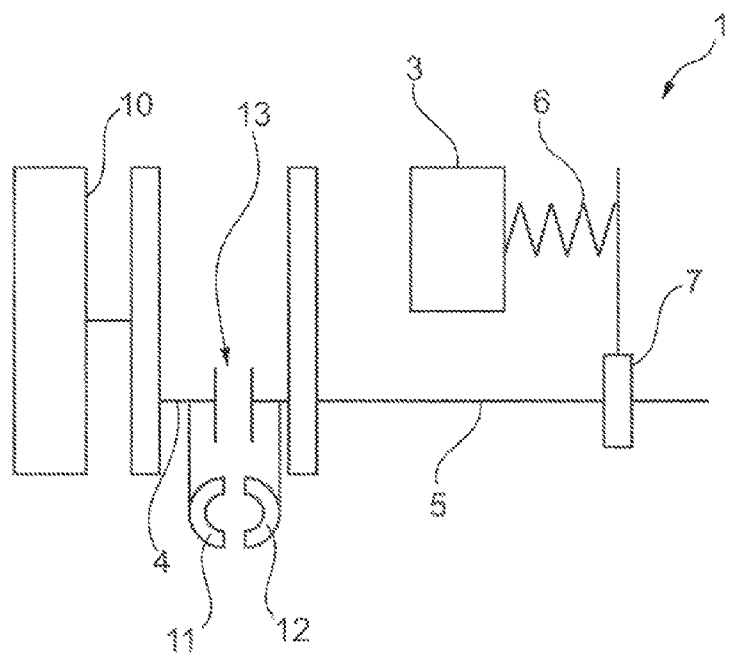
FIG. 5 is a basic layout diagram of an exemplary embodiment of a starter element; and, FIG. 6 is a basic layout diagram of an exemplary embodiment of a starter element.

FIG. 5 shows a third example of the starter element 1, which differs from the example of FIG. 3 only by the fact that the turbine wheel 12 is not integrated into the housing 3. In that respect, with regard to the other components of the starter element 1, see the description for FIG. 3.

Figure 6:
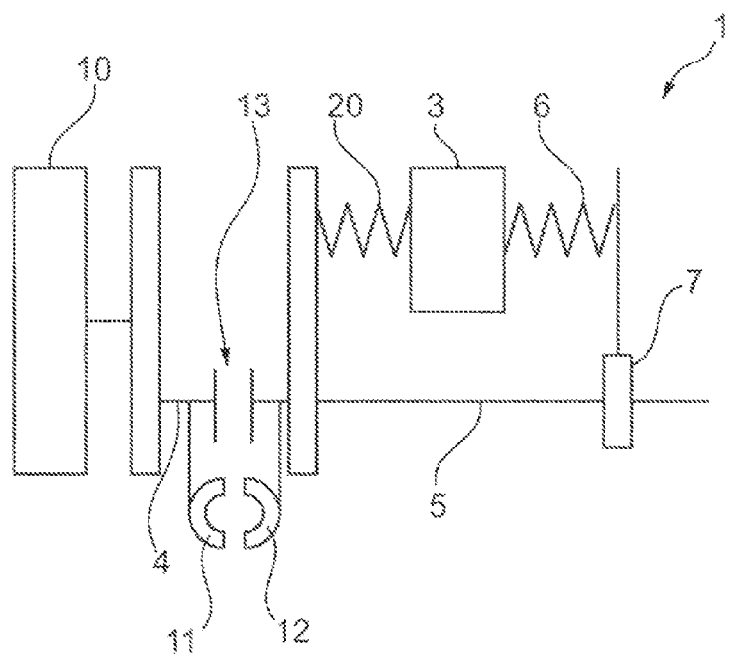

FIG. 6 shows a fourth example of the starter element 1, which differs from the example of FIG. 5 only by the fact that the housing 3 operates vibrationally with the aid of a second elastic element 20 between two elastic elements 6, 20. The elastic elements 6, 20 may be pre-tensioned against each other in this case.

The present invention is distinguished by a starter element for a drivetrain of a motor vehicle, whose housing is designed so that it reduces vibrations of the drive motor.

Thus, it is seen that the objects of the present invention are efficiently obtained, although modifications and changes to the invention should be readily apparent to those having ordinary skill in the art, such modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE CHARACTERS

1 Starter element
2 Motor vehicle
3 Housing
4 First shaft
5 Second shaft
6 Elastic element
7 Component
8 Spring
9 Crankshaft end
10 Drive motor
11 Impeller
12 Turbine wheel
13 Clutch
14 Transmission
15 Seal
16 Bearing
17 Diffuser
18 Axis of rotation
19 Transmission housing
20 Second elastic element

What is claimed is:

1. A starter element for a drivetrain of a motor vehicle, comprising:
   a first shaft;
   a second shaft operatively arranged to non-rotatably connect with the first shaft;
   an impeller non-rotatably connected to the first shaft;
   a turbine wheel arranged to connect with the impeller;
   a housing non-rotatably connected to the turbine wheel;
   a component non-rotatably connected to the second shaft; and,
   an elastic element directly coupling the housing to the component; wherein:
   in a first torque path of the starter element, torque is transferred from the first shaft to the second shaft, through the elastic element; and,
   in a second torque path of the starter element, torque is transferred directly from the first shaft to the second shaft, bypassing the elastic element.

2. The starter element of claim 1, wherein the elastic element is a spring.

3. The starter element of claim 1, wherein the housing is sealed fluid-tight with respect to the first shaft.

4. The starter element of claim 1, wherein in the second torque path, the first shaft is non-rotatably connected to the second shaft.

5. The starter element of claim 1, wherein the first shaft is drivable by a crankshaft end of a drive motor, the impeller is non-rotatably mounted and the turbine wheel is rotatably mounted on the first shaft, and the second shaft is drivable by the turbine wheel.

6. The starter element of claim 5, wherein the second shaft is drivable by the turbine wheel by means of the housing.

7. The starter element of claim 5, further comprising a clutch configured to non-rotatably connect the first shaft to the second shaft.

8. A motor vehicle, comprising:
   a drive motor;
   a transmission; and,
   a starter element, comprising:
      a first shaft;
      a second shaft operatively arranged to non-rotatably connect with the first shaft;
      an impeller non-rotatably connected to the first shaft;
      a turbine wheel arranged to connect with the impeller;
      a housing non-rotatably connected to the turbine wheel;
      a component non-rotatably connected to the second shaft; and, an elastic element directly coupling the housing to the component; wherein:

in a first torque path of the starter element, torque is transferred from the first shaft to the second shaft, through the elastic element; and, in a second torque path of the starter element, torque is transferred directly from the first shaft to the second shaft, bypassing the elastic element.

\* \* \* \* \*